United States Patent [19]
Case et al.

[11] 3,803,605
[45] Apr. 9, 1974

[54] TRACK GATE MOVEMENT LIMITER

[75] Inventors: Bernard Case, Tarzana; Jeffrey Ellis Miller, North Hollywood, both of Calif.

[73] Assignee: RCA Corporation, New York, N.Y.

[22] Filed: July 7, 1972

[21] Appl. No.: 269,538

[52] U.S. Cl.............................. 343/7.3, 343/6.5 LC
[51] Int. Cl. ........................... G01s 9/06, G01s 9/56
[58] Field of Search ........... 343/7.3, 112 CA, 6.5 R, 343/6.5 LC, 6.5 SS

[56] References Cited
UNITED STATES PATENTS
3,539,978   11/1970   Stedtnitz.............................. 343/7.3
3,550,129   12/1970   Steele............................ 343/112 CA
3,626,411   12/1971   Litchford ..................... 343/112 CA
3,691,559   9/1972   Jackson........................ 343/112 CA Primary Examiner—Maynard R. Wilbur
Assistant Examiner—G. E. Montone
Attorney, Agent, or Firm—Edward J. Norton; Joseph D. Lazar

[57] ABSTRACT

A limiter for the track gate rate of movement of a target being tracked by a radar system. The movement of the track gate is limited to a small increment, such as ± 1/120 nautical miles, between consecutive probe pulses requiring also that a target response must be in fact received in order to produce movement of the track gate. The probability that the track gate will be "pulled-off" a valid target by false targets or other noise is reduced significantly. Particularly suitable for a midair collision avoidance system such as SECANT.

6 Claims, 7 Drawing Figures

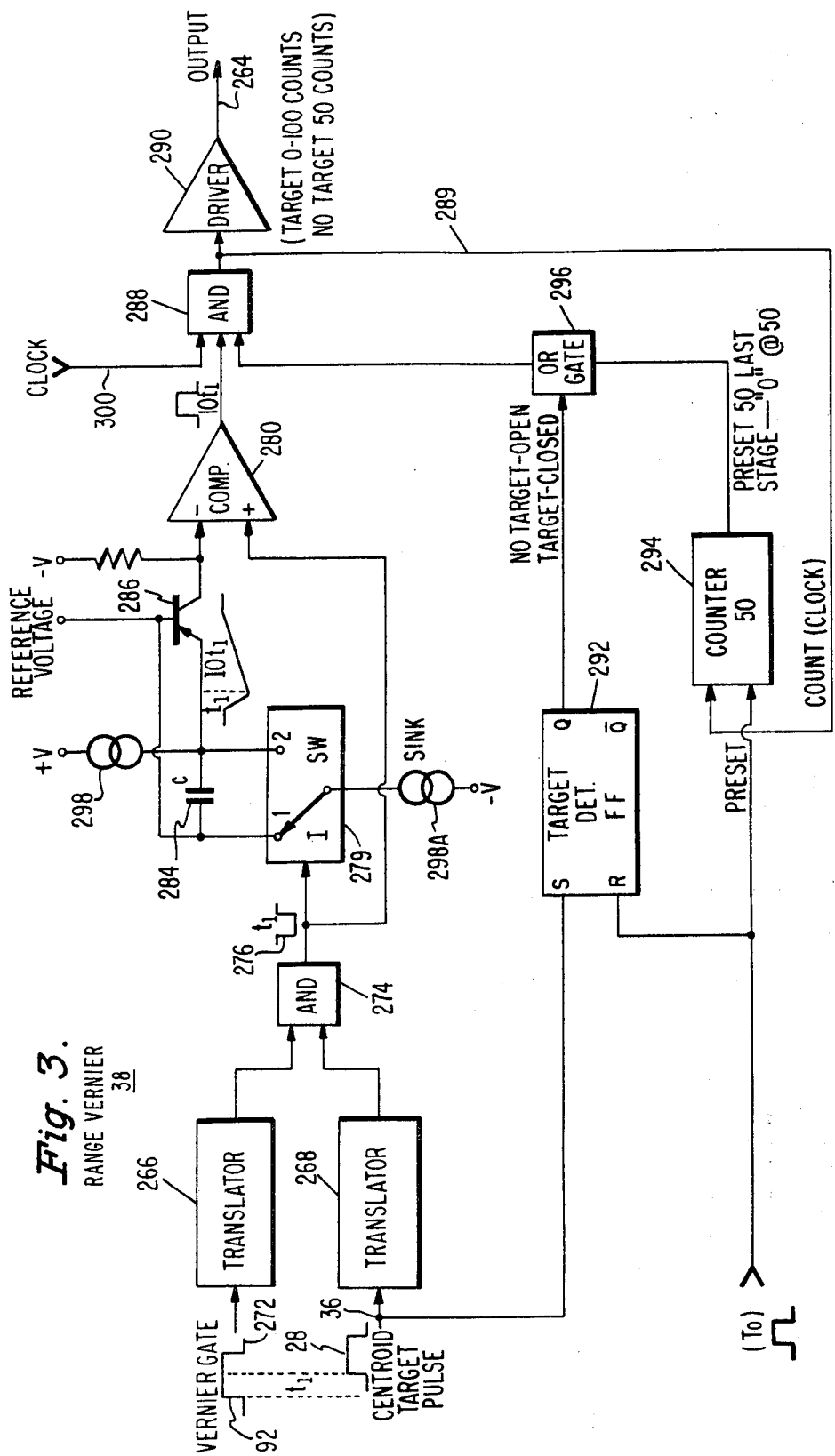

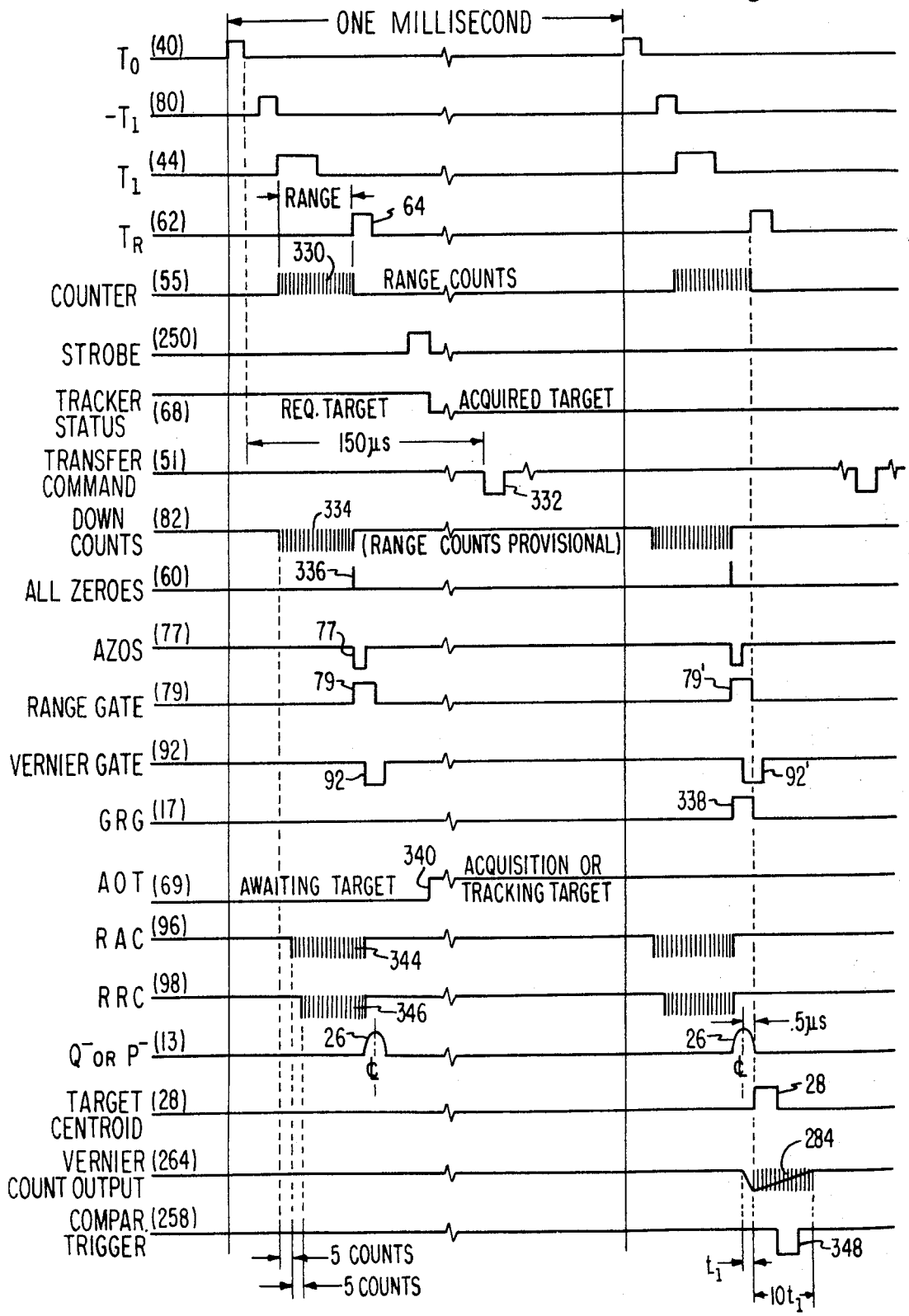

TRACK GATE MOVEMENT LIMITER

CROSS REFERENCE TO RELATED APPLICATIONS

Of interest are the following copending patent applications Ser. No. 735,716 filed June 10, 1968, entitled "Discriminating Signal System," and Ser. No. 27,403 filed Apr. 10, 1970, entitled "Separation Control of Aircraft by Non-Synchronous Techniques," both based on the inventions of Jack Breckman now about to issue, and the patent applications filed on even dates herewith entitled "Digital Range Rate Computer" based on the invention of Bernard Case and Jeffrey Ellis Miller and the application filed on even date herewith entitled "Digital Tracker" based on the invention of Bernard Case all four of which patent applications are assigned to the same assignee as the assignee of the present application.

BACKGROUND OF THE INVENTION

1. Field of the Invention

This invention relates to a limiter of the movement of a track gate in a digital tracker of aircraft collision avoidance system, more partcularly of the SECANT type.

2. Description of the Prior Art

The present invention is concerned with improvements to and extensions of the signaling system disclosed and claimed in the copending patent applications relating to the basic principles of SECANT which is a system for avoiding midair collisions between aircraft. Briefly, the copending patent applications of Jack Breckman describe a system consisting of a plurality of separate, essentially non-synchronous stations, which may be part of an air collision avoidance system. Each of the stations makes use of a pseudo-random or truly random, binary code.

The binary code is made up of a large plurality of successive bits which exhibit a very high degree of autocorrelation, but exhibit a very low degree of cross-correlation with respect to separate non-synchronous sources.

The discriminating signaling system of the copending applications takes advantage of this fact by shifting the frequency of successive interrogating probe pulses transmitted by a station of the system in accordance with the respective binary value of each of the sequential bits of the code generated at that station. Every aircraft station is provided with a transponder for transmitting a return pulse in response to each received probe pulse. Further, the frequency of each return pulse is shifted to manifest a binary value corresponding to that of the received probe pulse which induced the transmission of that return pulse. Stations which transmit probe pulses also include receiving means for receiving return pulses. However, only some of the received pulses (hereinafter referred to as "hits") received by any given station actually will be in response to interrogating probe pulses transmitted from that given station. The remainder of the return pulses (hereinafter referred to as "fruit") received by any given station will have been transmitted from transponders in response to interrogating probe pulses which originated at stations other than the given station. However, the given station may include a suitable correlation detector for discriminating between the "hits" and the "fruit." This is true because of the high degree of autocorrelation of the "hits" as compared to the very low degree of cross-correlation of the "fruit," as mentioned above.

The copending application Ser. No. 27,403 discloses an implementation of the system disclosed in Ser. No. 735,716 particularly disclosing an embodiment of a system using analog signals and processing.

SUMMARY OF THE INVENTION

The present invention provides limiter for the movement of a track gate for a digital tracker of aircraft suited for a midair collision avoidance system such as SECANT, providing means counting the present range determined by a track probe, transferring the count to a register for storage, after each probe comparing the stored count to the present count, then altering the stored count only by a prescribed limited amount for any change in the range.

DESCRIPTION OF THE DRAWING

FIG. 3 is a detailed circuit and block diagram of the Range Vernier (block 38) of FIG. 1.

FIG. 5 is a timing chart representing the sequence of operation of the tracker.

DETAILED DESCRIPTION OF A PREFERRED EMBODIMENT

Introduction

Figure 1:
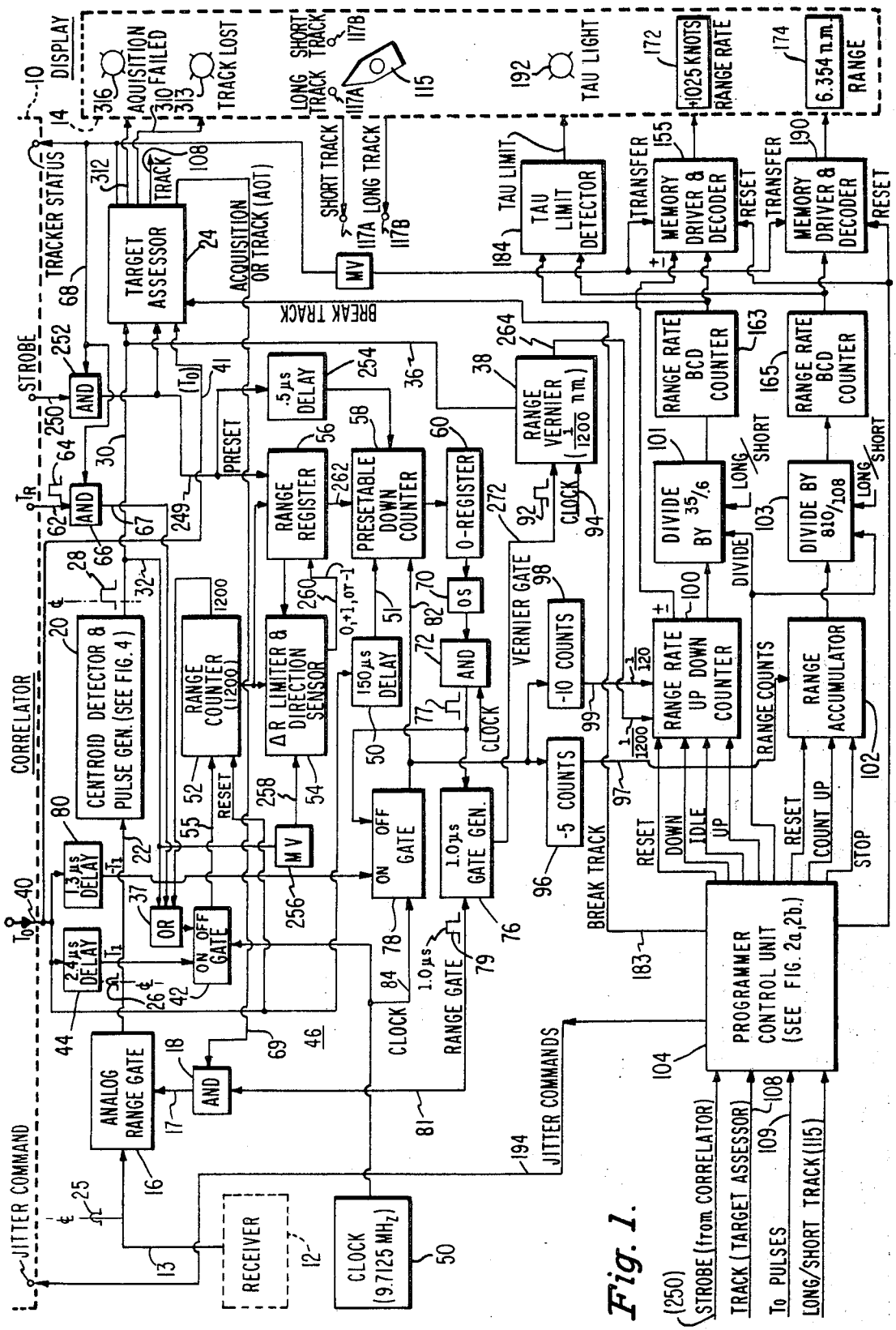
FIG. 1 is a block diagram of an embodiment of a digital tracker according to the invention.

In the SECANT system referred to above, SECANT being an acronym for a system for separation control of aircraft by non-synchronous techniques, three levels of airborne equipment are the (PWI) proximity warning indicator, (CAS) collision avoidance system, (TMS) traffic monitoring system. The function and performance characteristics of each of these tiers of airborne equipment is briefly summarized as follows:

The PWI serves for use on most general aviation aircraft providing a minimal installation on the most economic basis to provide a transponder known as a remitter (receiver-transmitter). The remitter transmits a return pulse in response to the receipt of an interrogating probe pulse from another aircraft of the system.

The probe pulse and the return pulse comprise bursts of different selected RF frequencies. The selected RF frequency of a return pulse is determined by the frequency of the inducing probe pulse and pertinent data pertaining to the aircraft on which the PWI remitter equipment is located. Data is manifested by the respective binary values of the sequence of return pulses transmitted by the remitter of any PWI. This permits each PWI to be sending in a party line among all the participating aircraft of the SECANT system. However, only the CAS and TMS airborne equipment incorporate means for receiving the data transmitted by the remitters of all participating aircraft over this party line.

The PWI provides shielded flying by alerting the pilot whenever another SECANT equipped aircraft flies within a preset range of his aircraft. After a pilot of an aircraft protected by a PWI has been alerted that an intruding aircraft has entered the shielded space surrounding him; visual acquisition, threat assessment, and avoidance maneuver are then up to the pilot of the protected aircraft.

The CAS portion of the SECANT system is designed for use in some military aircraft, executive-jet aviation, and more modest air carriers. It automatically, continuously inspects all apparent threatening aircraft and then discriminates between invalidly threatening aircraft and validly threatening aircraft. This makes it possible to minimize the likelihood of a false alarm in response to an apparent, invalid, threatening aircraft, so that needless evasive action by the pilot of a CAS protected aircraft is avoided.

The TMS portion of SECANT is provided in larger air carrier and military planes, providing all the features of the CAS system with additional functions. Such additional features include track-while-scan apparatus so that a pilot can view at all times on a cathode ray display the potentially dangerous traffic. Ground based air traffic control equipment may be integrated with the SECANT system by a suitable communication path such as a "hot-line" providing a data link rather than a voice link between all aircraft in the SECANT system and the ground station.

General System Considerations

The basic aim of the SECANT system is to provide the greatest possible protection for each protected aircraft (hereinafter referred to as the "ship") from being involved in a midair collision with any other aircraft (hereinafter referred to as a "bird"), while at the same time minimizing the likelihood of a false alarm. By false alarm is meant an indication to the pilot of the ship that there is imminent danger of a midair collision with a bird, when in fact no real danger exists.

In order to accomplish this, each ship must be capable of discriminating with a high degree of resolution between those birds in its general vicinity which are, in fact, definite candidates for collision with the ship, and those that really are not. Further, the system must reject all these latter birds in its general vicinity (hereinafter referred to as "flak") which are not in fact definite candidates for collision. Furthermore, it is important the system components stationed aboard a ship be made immune to much of the fruit signals and flak aircraft, in order to minimize the possibility of saturation of the signal processing capacity of the airborne SECANT equipment which would result from attempting to process, during the same time interval, signals from an excessive number of birds, as exists under dense traffic conditions.

All of the features of the overall SECANT system that contribute to achieve the foresaid required high resolution discrimination between actually dangerous birds on the one hand and flak on the other hand, and further in providing saturation resistance in dense traffic are fully described in the aforementioned copending applications, particularly Ser. No. 27,403.

Field splitting

One feature, termed band shifting, provides for means to separate on an equipment and system basis those aircraft that are flying below 10,000 feet, those that fly between 10,000 feet and some higher altitude such as 45,000 feet and those aircraft that fly above 45,000 feet. The SECANT system thus provides a means for changing the RF frequencies so that aircraft will be able to distinguish one altitude band from another. To obtain a total coverage of all aircraft both above and below the ship, aircraft provided with SECANT equipment carry an antenna on top for the upper hemisphere or field-above and one on the bottom of the aircraft for the lower hemisphere or field-below. Only the bottom antennas of birds receive a probe signal emanating from the top antenna of a ship which is below them and similarly the top antennas of birds received a probe signal from the bottom antenna of a ship which is above them. In the case of birds and a ship which are approximately the same altitude, both the top and bottom antennas of the bird and ship will be in communication with each other. By switching antennas, the ship is able to canvass first one field of birds and then the other. When both fields are searched, a round is completed. The effect of field splitting is to reduce the amount of fruit generated in the traffic.

Range Limiting

Each airplane has a characteristic hazard rate radius, depending on its obtainable speed and the maximum speed of the traffic beyond which oncoming aircraft are not of immediate interest. In the CAS and TMS system portions of the SECANT system, the space around the ship is portioned into 500-foot range cells or bins, and the accumulators provided for each of these range cells. These range cells, taken together are called the search file. The search file is truncated or limited to match the maximum range of interest.

PROBE AND RETURN THRESHOLDS

Hits correspond to transmitted probes. Therefore, the range limiting, discussed above, discriminates against hits outside the ship's hazard radius. However, received fruit does not correspond with the ship's probe signals. Therefore, the fruit which arrives at the ship which is due to fall into cells of the Search File of the CAS or TMS, or due to fall within the single cell of the PWI, may have been generated by birds both within and without the hazard radius of the ship. Thus, the range limiting, discussed above, does nothing to discriminate against the portion of the fruit which is received during the time periods in which the ship's SECANT equipment is searching for birds within its hazard radius.

According to the principles of SECANT as previously described in the aforesaid patent applications, the greatest enemy of fruit is distance and provision is made to use a uniform power level of the probe signal transmission by providing a threshold limiter in each remitter so that the remitter does not transmit a return signal unless a probe signal is greater than a predetermined strength is received thereby, the total amount of fruit generated in the SECANT system may be reduced significantly. In the CAS and TMS system in particular the output signal of the return signal detector are thresholded by a threshold which varies as a function of time and thus range from a relatively high value to a relatively low value in a manner similar to familiar sensitivity time control (STC) in radar

ASSIGNMENT OF COMMUNICATION SIGNALS EMPLOYED IN SECANT SYSTEM

In the previous discussion, certain aspects of the communication signals employed in the SECANT system were alluded to. For instance, it was mentioned that the SECANT system employs both a low band and a high band of signals, corresponding to aircraft altitudes below and above 10,000 feet, respectively. Either the upper or lower band is employed for transmitting probe signals from a ship to birds in its vicinity and for transmitting return signals, in response to received probe signals, from birds to ships. It was also mentioned that these return signals comprise a party line for transmitting data among participating aircraft. Further, the radiated power of both probe pulses and return pulses is nominally uniform from aircraft to aircraft. In addition, communication signals, besides those used as probe or return signals transmitted among the participating aircraft, include signals employed in the hot-line data link between aircraft and the ground.

In general, signals of interest to the present invention are as follows:

$T_O$ is a digital pulse signal that gates out the RF SECANT probes designated P and Q. The replies from the receiver associated with a tracker are designated $P^-$ and $Q^-$. These replies are used by the tracker and the correlator. The correlator uses the $P^-$ and $Q^-$ replies to establish the existence of a target based on autocorrelation techniques. Once the target has been established, it transfers the target location using a signal ($T_R$, FIG. 1) to tell the tracker where to find the $P^-$ and $Q^-$ replies from the receiver. Thus, the $T_O$ pulse is a digital pulse equivalent to the main bang of the radar and enables the transmission of P or Q probe pulses of the SECANT system. It is the pulse that starts the timing of the range interval that will be terminated by receipt at the ship carrying a tracker of a reply pulse manifesting a hit from a bird being tracked. It is approximately 1.2 microseconds wide and occurs approximately once every millisecond.

A signal designated $T_R$ is used for controlling target acquisition by the tracker. It is generated from the range bins of the SECANT correlator to designate the range under consideration. The correlator is used to examine the auto-correlation of the P or Q probes and the $P^-$ and $Q^-$ returns described in the aforesaid copending applications and thereby establish the existence of a target for the tracker to track. The signal $T_R$ can also be derived by digitizing the video reply signal from the receiver 12.

The correlator range bins are used to establish the range of a potential target. Each bin includes an integrating capacitor which indicates by a voltage exceeding a predetermined minimum the presence of a detected bird in that given range bin. A similar integrating range bin may be formed of up-down counters. The output of the up-down counters are segregated into bins of 500-foot intervals according to one form of SECANT. The output ($T_R$) of such a bin is an input signal to the digital tracker.

The correlator strobe pulse (received over path 250, FIG. 1) is the signal which confirms the existence of a target. In the correlator of SECANT the strobe pulse is generated in response to the pulse $T_R$. It may be generated by a variable digital delay circuit arranged to provide a suitable delay to prevent interferences with the $T_R$ signal and the next $T_O$ pulse.

Tracker status signal (over path 68, FIG. 1) is generated by the digital tracker by its target assessor during the time the digital tracker is not tracking a target, thus indicating to the correlator that a new target can be received for tracking.

DETAILED DESCRIPTION OF A PREFERRED EMBODIMENT OF THE DIGITAL TRACKER SYSTEM

FIG. 1 is a system block diagram including, in part, digital logic of the preferred form of a digital tracker useful in a SECANT collision avoidance system. It should be understood however, that the digital tracker is not limited in its utility only within a SECANT system but will, as understood by those skilled in the art, be useful in those radar systems in which a tracking function is required.

In brief, the digital tracker functions to track a target that has been suitably located by the correlator of SECANT. The correlator 10 provides a signal ($T_R$) to the tracker after the tracker has signaled the correlator by a tracker status signal (path 68) requesting a target to track.

The tracker receives a "main bang" pulse ($T_O$) over path 40 corresponding to the transmission of an RF P, or Q interrogation signal from the station aircraft. The range counter in the tracker (52) counts clock pulses (proportional to range) either throughout a maximum limit (1,200 counts for 10 miles), or, until a signal ($T_R$) from the correlator indicates a target location corresponding to a $P^-$ or $Q^-$ signal, or, until a reply (signal 28) from a target is received. Note, that the three alternatives are represented by the three inputs to OR gate 37, to be discussed further. Once the target is verified by the correlator, a strobe signal (path 250) loads a range register (56) for storing the range counted by range counter (52) during the preceding period when a new target range signal $T_R$ occurred.

The range is read into both a range rate counter (100) and a range accumulator (102) for the continuous computation of the range and range rate while the target is being tracked. This tracking will occur for 678 $T_O$ pulses for a long track mode or 90 $T_O$ pulses for a short track mode.

A tracking gate (79) surrounds or is centered about the reply signal (26) and provides a limiting change in the range to avoid errors in range due to noise, and unwanted target signals, while prohibiting receiver output signals from detector 20 except during a very narrow range gate period. This is achieved in a digital feedback loop consisting mainly of a detector (20), a limiter (54), and a gate generator (76).

The computation of range and range rate is used also to determine tau, the time for a closing target to a possible collision.

Referring now to the drawing with particular reference to FIG. 1, the digital tracker system illustrated responds to signals provided by a suitable target detector, which may be correlator 10, and a receiver 12, which may include an RF amplifier, a mixer, a local oscillator and an IF amplifier. The output of the digital tracker provides readouts and other signals read onto the display panel 14 indicating the average target range, range rate and "tau," the closure time. A suitable receiver is described in a copending U. S. patent application by L. H. Anderson, entitled "Asynchronous Pulse Receiver," assigned to the common assignee.

A suitable correlator is described in detail in the previously mentioned copending application Ser. No. 27,403, filed on Apr. 10, 1970, entitled "Separation Control of Aircraft by Non-Synchronous Techniques." Particularly reference is made to the block diagram of FIG. 9B thereof wherein a block "945" identified as the "Defruiting Correlation Detector" is shown. Reference is made also to the range, range rate, and "tau" (R, R. and Tau) tracker and computer indicated by block 955 in FIG. 9B and also shown in greater detail in FIG. 18 of said application, as one form of a tracker and computer useful in a SECANT system. The present invention is an improvement of the tracker and computer of the system described in said application.

An exemplary application of the present invention illustrated in FIG. 1, includes a correlator of the type arranged to process SECANT signals.

Although the correlator search file and control and other associated control circuits described in said copending application are of the analog type, the digital circuits of the present embodiment may be coupled to them as will be understood by those skilled in the art. Thus, the leads of FIG. 9B may be coupled to certain leads of the circuit of this application with suitable analog to digital conversion logic circuits as follows. Lead 956 corresponds to lead 62 of the present FIG. 1; lead 957 to lead 13; lead 958 corresponds to the "tracker status" lead on path 318 of the present FIG. 1; and lead 963 of FIG. 9B corresponds to lead 184 of FIG. 1 herein. It should be understood however that the invention may be employed, to equal advantage in other systems including conventional pulse radar application such as squinted or side-looking, synthetic-array types wherein a range tracking function is required.

When used with a radar system, the radar system need only provide the usual reference signals indicating the main bang or the transmission signal, the detected video envelop of the reply signal, and a preset signal occurring after the first video reply pulse of the track period but prior to the second main bang of the track period. Such an arrangement will be better understood in view of the description of an embodiment of the present invention which is to be described.

Figure 4:
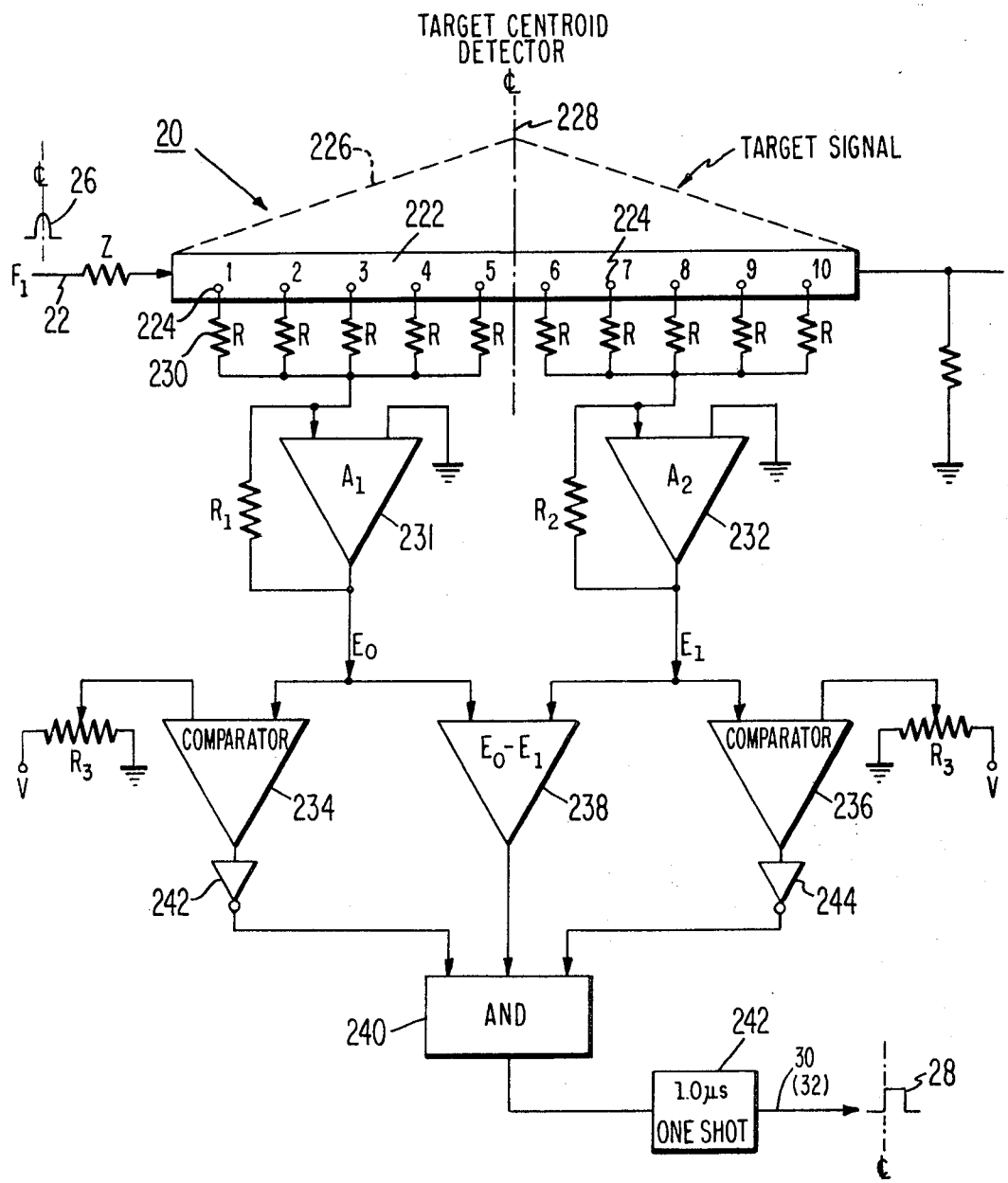
FIG. 4 is a circuit and block diagram illustrating a preferred form of a centroid detector shown in block 20 of FIG. 1.

The digital tracker illustrated in FIG. 1 includes a normally disabled analog range gate 16 enabled by an output from a two-input AND gate 18 to pass signals received over conductor path 13 from receiver 12. The output of range gate 16 is conducted to pulse detector 20, preferably of the centroid type over conductor 22. A detailed description of a preferred form of a centroid detector will be described later in conjunction with the detailed schematic shown in FIG. 4.

The raw, video signal represented by waveform 26 is processed by the detector 20 which determines the centroid of the target signal rather than the leading edge as is done in more conventional systems in the radar art, for example. The output of the detector 20 is a pulse 28 whose leading edge corresponds to the centroid or central portion of the video pulse 26 in a manner that will be explained in greater detail in conjunction with the description of FIG. 4. The phase relation of the pulse 28 to pulse 26 is not critical provided the difference is known and accounted for in the design of the tracker. The target signal 28, now in digital form, is conducted over several paths first to the three-input OR circuit 37 by conductor 32, second, to a Target Assessor circuit 24 over conductor 30, and third, to a Range Vernier 38 over conductor 36. The input signal $T_o$, is received into the tracker system over conductor 40 and is used by several logic circuits. The signal $T_O$ is conducted to an on-off gate 42 after a delay of 2.4 microseconds by a digital delay means 44, suitably a binary counter or shift register in IC form. Pulse $T_o$ is also conducted over path 46 to a suitable presetable down counter 58 after being delayed 150 microseconds by a delay 50. Pulse $T_o$ is also passed to a gate 78 after a 1.3 microsecond delay 80.

When gate 42 is rendered conductive by a $T_o$ pulse, clock pulses from clock source 50 are applied to a range counter 52, over conductor 55. The clock 50 is nominally a 10 megahertz clock, but preferably, for the purposes of the digital tracker in a SECANT environment, the clock rate is 9.7125 megahertz. Clock 50 generates about 10,000 counts during each 1 millisecond probe period. It should be noted that 1,200 counts is equivalent to about 10 nautical miles of range. Accordingly, 10,000 counts from clock 50 is in the order of 100 miles nautical of range for each consecutive probe pulse. The range counter 52 is one of the components of what may be termed a "track gate movement limiter" comprising a change in range, i.e. a Δ range limiter and direction sensor 54, a range register 56, a presetable down counter 58, and a zero-detector 60.

TRACK GATE MOVEMENT LIMITER

The track gate movement limiter feature of the invention provides for greatly decreased probability that the range gate pulse 79, to be described, will be pulled off of a valid target by false targets or other noise. Pulse 79 serves as a range gate pulse and will be hereinafter designated as a "range gate." The limiter is arranged to limit the movement of the range gate to ± 1/120 nautical miles between consecutive probe pulses. In addition the limiter is arranged so that a target response must be received to produce movement of this range gate. The rate of movement is sufficient to accommodate the fastest closing, or opening rates of a valid target while at the same time restraining false targets, or noise, appearing any where within the range gate for moving the range gate off of the valid target.

The range counter 52 portion of the limiter is formed of a group of digital counters which accumulate the count started by clock 50 during the time interval from the probe pulse $T_o$. The time interval between the probe to the time the correlator target response is received is the interval during which counter 52 is counting the clock pulses. The correlator target response signal ($T_R$) is received over conductor 62, the signal being indicated by the waveform 64, and passes through two input AND circuit 66 and then is conducted to OR gate 37 over conductor 67. The AND circuit 66 is rendered conductive over conductor path 68 by a control signal from the target assessor 24 manifesting a target request mode.

The correlator strobe signal occurring just after $T_R$ will inactivate the target status signal 68 thereby inhibiting further $T_R$ signals from passing through AND gate 66 on path 67 and instead activating the acquisition or track line 69 which will enable AND gate 18, allow range gate 79 to gate on analog range gate 16 and thus allow receiver replies to flow through detector 20 and OR gates 37.

The gate 42 is rendered operative to pass clock pulses to range counter 52 when the $T_O$ signal pulse is passed through the 2.4 microsecond delay 44. The range counter 52 is turned off when any of the three inputs of OR gate 36 is energized indicating that a target return pulse 28 has been received or the $T_R$ pulse over path 62 has been received or the range counter has counted to 1,200. The range counter is arranged to receive up to 1,200 pulses of the clock which, as indicated previously, is equivalent to a range of about 10 miles. In the preferred form of the system, a 10 mile range is adequate for the purposes to avoid collisions. Accordingly, the range counter is allowed to count through 1,200 counts in the event no signal 28 is received from detector 20. Any signal 28 that is received would cause the OR gate 37 to inactivate the gate 42 and thereby stop the counter at some count less than 1,200.

Range register 56 provides the range prior to the present track count. It is initially arranged to receive the count registered in the range counter 52 by a preset pulse over conductor 249 from the strobe signal of the correlator after passing through AND gate 252. The delta-R ($\Delta$) limiter and direction sensor, suitably a comparator provided with a feature of indicating relative values of the range counter 52 to range counter 56 serves as a means for effecting a smooth change in the range register 56 of counts that change in range counter 52. This is effected by providing that after each succeeding probe pulse, $T_O$ over lead 40, the new target count is recorded in range counter 52 by the operation of the gate 42. The count of range counter 52 is compared with the range count stored in the range register 56, from the preceding register, only if a target response is received which is manifested by pulse 28 being conducted over path 32 through an astable multivibrator 256, (ONE SHOT) and applied as a "stretched" pulse to the sensor 54. The trailing edge of the target "stretched" pulse on path 258 is used for this purpose because this edge occurs after pulse 28 by the delay of ONE SHOT 256 thus to activate 54 after only range counter 52 has completed counting. The comparison function is accomplished by using the return target pulse 28 to generate the "stretched" pulse as an enabling pulse for the comparator 54 over the input lead 258. The enabling pulse will induce a single pulse from one of the three possible outputs from the comparator 54 depending upon whether the range counter is "less than," "greater than," or "equal to" the count stored in the range register 56. Conductor path 260 passes the single pulse from one out of three possible outputs indicated by the zero, +1, or −1 on path 260. When the count in register 52 is the same as register 56 the count will not be changed which is indicated by the pulse 0. If the count of range counter 52 is greater than the range resistor 56 regardless of the amount of the count, the comparator 54 will pass a +1 pulse to the range register 56 to increase the count therein by 1. Conversely, if the count in range counter 52 is less than the range resistor 56, regardless of the quantity of count, a signal corresponding to −1 will be generated by the comparator 52 and passed to the range register 56 to cause thereby the range register count to be reduced by 1 count.

The output of the range register 56 is first transferred to a down counter 58 by the $T_O$ pulse indicating the transmission of a probe pulse after passing through the 150 microsecond delay 50. This causes the range register (56) reading to be read into the down counter 58, and then counted down by means of the gate 78 being rendered operative by the $-T_1$ pulse, passed through the 1.3 microsecond delay 80. It should be noted that this pulse is 11 clock pulses ahead of the $T_1$. Of the 11 pulses, one pulse is needed for digital propagation delays. Te remaining 10 pulses are required to position the range gate 79 about the video reply signal 26. Since the centroid detector pulse 28 occurs 0.5 microseconds after the center of the video signal 26 due to a delay line in the centroid detector. Therefore, to center the leading edge of the pulse 28 within the range gate 79, the range gate pulse 79 must have its leading edge 1 microsecond ahead of pulse 28. The gate 78 enabled, passes clock pulses over path 84 to the down counter over path 82. The down counter now reduces its count at the rate of the clock pulses until zero is detectd by the zero register 60. The zero-register or detector 60 is suitably formed to actuate a ONE SHOT multivibrator and a gate, the gate being controlled by the output of the down counter 58. MOre specifically it is preferred that the gate is arranged to be pulsed by the "borrow" output of the down counter 58. When the down counter 58 counts down to zero, it creates a borrowed pulse which is used to clock other counters, as known in the art. The output pulse of the down counter 58 when registered at zero is then used to trigger the ONE SHOT (OS) 70, which when pulsed, applies a signal to two input AND gate 72, the other input to AND gate 72 being a clock pulse. AND gate 72 operated, applies a signal to one microsecond gate generator 76 and to "off" terminal of gate 78, terminating the clock pulses to the down counter as well as to the −5 and −10 count units, 96 and 98. It is noted that the leading edge of pulse 77 from AND gate 72 is the input to the gate generator 76 developing the 1 microsecond range gate pulse 79 to be applied to AND gate 18. The range gate pulse 79 will be explained in greater detail in a later section.

The gate generator 76 also applies a one microsecond pulse 92 whose leading edge nominally coincides with the center of range gate 79 to a range vernier 38 which increases the range resolution in a manner to be described. Thus the gate generator 76 provides the range gate pulse 79, which is 0.5 microseconds leading vernier pulse 92. Clock input 94 from clock 50 is continuously applied to the range vernier 38.

It should be understood that the track gate movement limiter just described has application in other radar systems where the need for a smooth, accurate, average range count is desired to prevent spurious inputs from affecting a range count. Thus, the output lead 262 from register 56 may be used for carrying such range count information to the utilizing circuits in a manner known in the art.

RANGE VERNIER

The range vernier 38 (FIG. 1) is a digital logic circuit arranged to increase the range resolution by a significant factor over conventional systems. In the preferred form, the range resolution is increased by a factor of 10 to obtain a resolution of 5 feet from 50-foot range measurements. This is accomplished by "stretching" the time interval between the leading edges of the vernier gate 92 and the centroid detector target pulse 28 by 10 times. When no target response is received over path 36 of the pulse 28, a range count to the trailing edge of the vernier gate pulse 92 (see FIG. 5) (being equivalent to 50 clock counts) is applied over lead 264 to range rate counter 100.

Figure 3A:
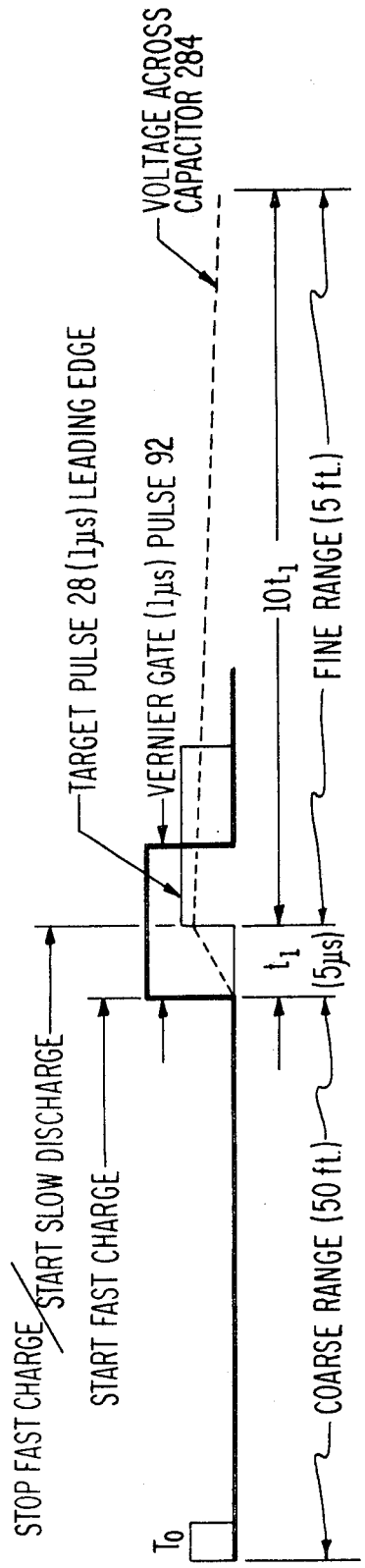
FIG. 3A is a diagram illustrating the principle of the Range Vernier.

A preferred form of the range vernier is shown in FIG. 3. A first translator 266 and a second translator 268 suitably formed of integrated circuitry of the emitter coupled logic (ECL) type is used to convert TTL logic signal voltage levels to ECL voltage levels. The centroid detector pulse 28 is conducted to translator 268 over lead 36. The vernier gate 92 (see FIGS. 1 and 5) is conducted to translator 268 over path 272 from gate generator 76. The respective outputs of the translators 266 and 268 are applied to a two input AND gate 274 which is energized when the vernier gate pulse 92 is present and the detector target pulse 28 is absent. The time interval $t_1$ measured from the leading edge of the vernier gate 92 to the leading edge of the target pulse 28 (as shown in FIG. 3a) is a measure of the range from the center of the range gate 79 to the target pulse 26 and is nominally equal to the time interval represented by five clock pulses. AND gate 274, when energized, produces a pulse 276 of duration $t_1$, which is applied to a suitable current switch 279 and the comparator 280. Across output terminals 1 and 2 of switch 279 is a capacitor 284 one terminal of which being connected to the base of a transistor 286 and the other terminal of which being connected to the emitter terminal thereof. The output collector terminal of transistor 286 is coupled to the comparator 280. The output of the comparator 280 is coupled to a three input AND gate 288 which, in turn, is coupled to a suitable driver 290, the output of which is conducted on path 264 (common also to FIG. 1). The reset function is obtained in the $t_0$ pulse applied to the R-terminal of a FF 292 and to one input terminal of a count-to-50 counter 294. The S-terminal of the FF 292 also receives the target pulse 36. The output of counter 294 is coupled to a gate 296 whose output is one input of the 3-input AND gate 288. Counter 294 is arranged to be preset so that the last stage is a logical 1 when reset by $T_0$ and is set to a logical 0 when the count is 50.

In operation the range vernier stretches the interval $t_1$ by 10 times to achieve a range resolution of five feet by quantizing this stretched interval with a 10 MHz clock (50). DUring the time $t_1$, (see FIG. 3a) a constant current from source 298A charges capacitor 284 and thereby cuts-off transistor 286.

Although the minus input to comparator 280 is now returned to negative voltage, the plus input of comparator 280 is also negative due to pulse 276. After pulse 276 is terminated at the end of a period $t_1$, the minus input of comparator 280 is now more negative than the positive input thereby activating the output of comparator 280. The output will remain activated for as long as transistor 286 is turned off, an interval of time equal to 10 $t_1$ as represented by the waveform 10$t_1$.

After the leading edge of the target pulse 28 is received, capacitor 284 is discharged with a second constant current source 298 which is 10 times smaller than the charge current source 298A. Thus, the time required to discharge the capacitor 284 to its initial state will be 10 times longer than the charging time.

The magnified time (10 $t_1$) is measured by counting the number of clock pulses from clock 50 occurring during the time interval 10 $t_1$.

When the output of comparator 280 is high and the output of OR gate 286 is also high, AND gate 288 is thus enabled and passes the clock through lead 289, OR gate 286 is high when either FF 292 or counter 294 is high. Counter 294 will stay high after being preset by $T_0$ until 50 clock pulses are counted over lead 289. FF 292 will switch high, after initially being reset low by $T_0$, when the centroid target signal 28 arrives at the S input. Thus, if no target signal 28 arrives, comparator 280 will be low for the duration of the vernier gate and OR gate 296 will remain high for 50 clock counts after which time it will inhibit AND gate 288 and prevent further pulses from the input to driver 290 and counter 294 over lead 289. If a target signal 28 arrives, OR gate 296 will remain high and AND gate 288 will remain enabled for as long as comparator 280 is high, a time period equivalent to the time interval 10 $t_1$.

Referring now to FIG. 3A there is shown a plot illustrating the timing of the several signals used in the range vernier. In those probes where no target response $T_0$ is received, 50 clock pulses are supplied to the range rate counter 100 (FIG. 1) under control of the count-to-50 counter 294. This function is accomplished by arranging gate 296 open when no target pulse 28 is received and closed when the target 28 is received.
(Range Gate Pulses)

The 1 microsecond gate generator 76, (FIG. 1) suitably a 10 count digital counter, is arranged to generate a 1-microsecond pulse in response to a pulse generated by AND gate 72 after the zero register 60 has detected that down counter 58 has counted to zero as has been described. More particularly, it is preferred that the gate generator 76 develop the 1 microsecond pulse in response to the leading edge of the pulse 77.

The gate generator 76 may be implemented as a ONE SHOT gating circuit which develops a 1 microsecond pulse in response to the leading edge of input pulse 77. However, it is preferable to use for the gate generator a counter that develops a pulse for a time interval measured by counting pulses at 10 megahertz after the signal pulse 77 is applied to its input. Counting the 10 megahertz pulse is more reliable for assuring a pulse length of 1 microsecond.

The 1 microsecond pulse, which is termed the range gate 79, shown on conductor path 81, is applied to the AND gate 18 which when gated on by the target assessor 24 passes pulse 70 to the analog range gate 16 for tracking the target reply pulse from the receiver 12. As will be explained hereinafter, this arrangement is essentially a digital feedback loop whereby the output pulse 28 from the centroid detector 20 is used to be tracked by the range gate 79.

The range gate 16 is preferably a high speed FET device because of its high on-to-off resistance ratio and its low signal attenuation property. It should be noted that the one microsecond range gate pulse 79 has been selected as a preferred period of time to regulate the operation of the analog range gate 16 so as to provide the best discrimination of the desired track signal from the undesirable fruit which may be received through the receiver 12. A 1 microsecond pulse is preferred to provide target correlation or detection within 500-foot intervals and also to be substantially equal to the video pulse 26.

It will be appreciated that the range gate 79 is continuously repositioned about the moving target pulse from the receiver at a repositioning rate of discrete 50 feet intervals of change within 1 millisecond. THis is achieved in the digital feedback loop around the detector 20 therefore minimizing the chances of a target being lost or a new target being received and tracked in confusion with the previous target that was being tracked. In other words, the range resistor 56 is updated by 100-nanosecond pulse ever millisecond.

Thus, the range gate 79 is arranged to follow the incoming target signal 26 after many probes of the SECANT P and Q signals as previously explained. As the target is being tracked for 678 probes for a long track or 90 probes for a short track the down counter 58 is being repeatedly read into the range rate counter 100 and range accumulator 102 as will be described with the programmer 104.

RANGE, RANGE RATE AND TAU

The manner in which the count of the range is made that eventually will be passed on to the range rate counter 100 an the range accumulator 102 is accomplished by turning on a clock for the period of time that is required to count the down counter 58 down to zero.

In order to measure this period of time, clock 50 is turned on at time $-T_1$. The on-off gate 78 for passing the clock pulses is turned on at this time $-T_1$, a time which is determined by the digital delay line 80, suitably, 1.3 microseconds after $T_0$, noting that time period $-T_1$ is 11 clock pulses ahead of time period $T_1$ as previously explained. Gate 78 is turned off by the trailing edge of the output pulse from AND gate 72, such pulse representing the down counter 58 reading zero. The gate 78, being turned off, therefore stops all of the clock pulses from being applied to a $-5$ counter 95 and a $-10$ counter 98 as well as preventing further clock counts from going into the down counter 58.

In order to compensate for the inherent delays in the detector 20, counters 96 and 98 may be used to absorb a certain number of clock pulses corresponding to the delay of the detector. Thus, in this embodiment with a delay of 0.5 microseconds within the centroid detector 20, the $-5$ and $-10$ count counters conduct the clock pulse inputs to the range rate counter 100 and the range counter 102.

The $-10$ count counter 98, serves to compensate for the five-count delay in the detector 20, the other five counts being used in conjunction with the function of the range vernier 38. The range vernier 38 expands the final five counts, resolving them to 5 feet, as described in the section under "Range Vernier." Thus, it should be noted, the down counter 58, in effect, controls the number of clock pulses that are fed to the range rate counter 100 and the range accumulator 102. Each clock pulse from gate 78 represents about 50 feet, and more precisely, each clock pulse is 1/120 nautical miles, while each clock pulse from range vernier output driver 290 (FIG. 3) over lead 264 is five feet or 1/1,200 nautical miles.

(PROGRAMMER)

The programmer control unit 104 comprises logic circuits for dividing either the long or short tracking cycle into three preferably equal portions. Statistical smoothing is provided according to the invention to achieve increased range rate accuracy. In brief, the manner in which this is achieved is, first, to determine the range for a portion of a tracking period, then, inhibit the range counter for another portion of the tracking mode, and then to determine the range for the last portion of the tracking mode. A preferred proportioning is one-third for each phase. The two range portions on the initial and the final portion are compared and the difference is averaged. In addition, means are provided for determining whether the target is approaching or leaving the station, this information being used in the determination to indicate whether the target is a threat to the station aircraft.

The programmer control unit 104 is shown in greater detail in FIG. 2. The programmer unit comprises a probe counter 106, suitably an arrangement of digital counters, having an input, a reset and an enabling input. The enable pulse or tracking pulse is conducted over path 108 from target assessor 24 (FIG. 1). The output of the probe counter 106 is applied to a digital comparator 110 which is provided with two fixed memories, for detecting when the appropriate number of probe pulses are received. Memory 112 (a suitable voltage source for OR gate 120) shown with the reference numeral 226 and memory 114 with the reference numeral 30 each programs the number of probe pulses that are to be counted for each of the up and down counts of the respective tracking periods. The 226 pulses are used for the long track which is manually selected by the operator by a switch 115 (FIG. 1). The 30 represents the number of pulses that are used for the short track also manually selected by a switch 115 (FIG. 1). The AND gates 116 and 118 serve to inhibit either one or the other of the memories 112 and 114 and through OR gate 120 determines which memory (112 or 114) the comparator 110 will use to compare to the probe pulse count provided at the input of the probe counter 106.

When the track period starts, the track signal from the target assessor 24 over path 108 will enable probe counter 106, reset range rate up-down counter 100 to count up, and reset range accumulator 102. THus, after a count of 30 $T_0$ pulses with the probe counter in the short track mode, the comparator 110 will provide a pulse to a digital counter 122 which is designated for this embodiment as a "three cycle counter." The same output pulse of the comparator 110 also serves as a reset pulse over conductor path 125 through an OR gate 127 for resetting probe counter 106.

The input pulse to counter 122 from comparator 110 causes counters therein to produce a pulse (change in voltage level) over path 1 to a ONE SHOT 124 and then to an OR gate 126 whose output is carried over path 128 to the "stop" terminal of range rate up/down counter 100.

After the second series of 30 $T_0$ pulses have been counted by probe counter 106 and compared by the comparator 110, the pulse received by the counter 122 is passed through its output lead 2 through ONE SHOT 130 over path 132 through OR gate 134 to the down terminal of the counter 100.

After the third set of probe pulses are counted, causing the comparator 110 to trigger counter 122, the output therefrom, over lead 3, energizes ONE SHOT 136 which develops a pulse 138, the leading edge of which is passed through the OR gate 126 then over path 128 to the "stop" terminal of counter 100 to stop that counter from further counting. At the same time, pulse 138 is conducted over path 140 to the stop terminal of the range accumulator 102. The leading edge of pulse 138 stops further counts of the accumulator 102 of range pulses. The trailing edge of pulse 138 is utilized over conductor 142 to a FF 144, to a gate 146 over conductor path 148 and gate 150 over conductor path 152. The pulse 138 is also applied to a memory driver and decoder 154 over path 156, its trailing edge for time delay purposes serving to sample the logic state of the most significant bit of the range rate counter 100 to determine whether or not the counter underflowed and thereby determine the sign of the range rate.

The gates 150 and 146, now gated on by the pulse 138, pass clock pulses 50 to the OR gates 158 and 156 and then to the rante rate counter 100 and the range accumulator 102 respectively. Pulsing the range rate counter 100 by gate 146 through the OR gate 156 causes the counter 100 to count down from the count then recorded therein into zero detector 160. During the count down to zero, the output of the range rate counter 100 is applied to the modulo N divider 162, a component of the divider 101 (FIG. 1). Note that during the period the range rate counter 100 is clocking down to zero, the modulo N divider 162 is also being clocked over lead 164 through gate 146. When the zero detector 160 indicates zero, it develops an output pulse over path 166 to the off terminal of gate 146 whereby inhibits further clock pulses from passing through OR gate 146 to modulo N divider 162. In a similar manner modulo N divider 168 is also provided with the number of pulses from the range accumulator as it counts down to zero through its zero detector 170 to inhibit gate 150 by the off terminal thereof.

The modulo N dividers 162 and 168 are arranged to divide the count corresponding to range rate (100) and range accumulator (102) and to convert the pulses into knots and nautical miles as displayed by read-outs 172 and 174. Accordingly, modulo N divider 162 is provided with OR gate 176 under control of AND gates 178 and 180, manually selected for operation by the short track and long track switch 115 (FIG. 1), previously described. Gate 178 provides a suitable control bias voltage for divider 162 which represents conversion number 35 while the short track AND gate 180 provides, in a similar manner, conversion number 0.6. These conversion numbers as will be appreciated by those skilled in the art are determined to convert the pulses for the long and short track to knots based on the clock pulse rate per nautical mile, the number of samples taken, and the average count range time between the up count phase and down count phase. For this embodiment based on a 1 millisecond probe interval used in a mode of the SECANT system, the conversions into knots and nautical miles are as indicated in the programming blocks of the dividers 162 and 168. Further, the divider 168 could be suitably located in the range count path to the range accumulator 102 to thereby simplify the logic circuits.

(DIVIDE COMMAND)

Figure 2A:
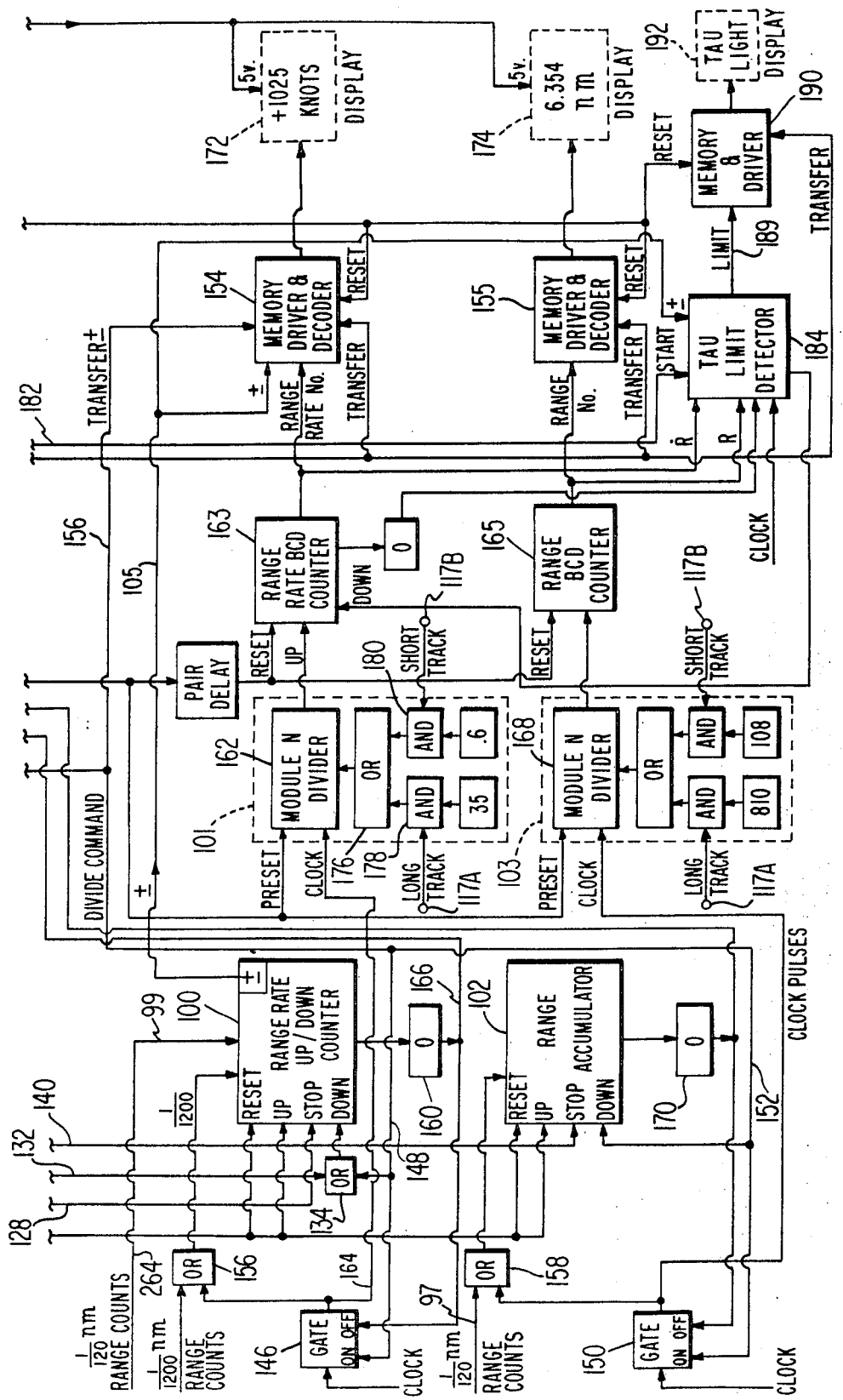
FIGS. 2a and 2b are together a more detailed portion of the diagram of FIG. 1 illustrating the Programmer block 104 and the Range rate, range accumulator and tau operation.
Figure 2B:
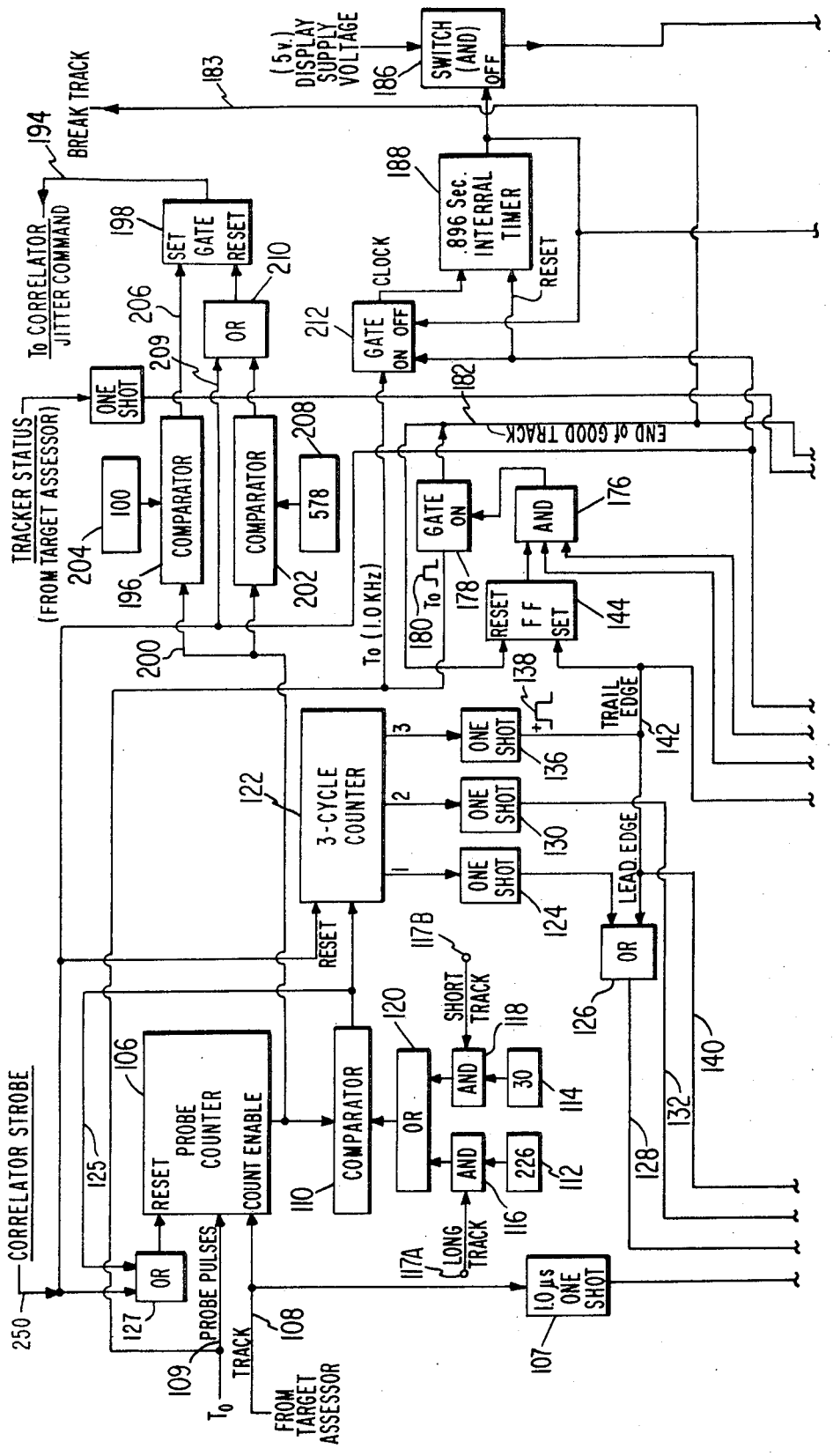

The divide command signal preferably utilizing the trailing edge of pulse 138 for the logic circuits is distributed by the Programmer 104 over conductor path 142 (FIG. 2b). It is the indication that the three-cycle counter 122 has completed its three phases of operation, meaning that the complete track cycle has ended. This information is stored in FF 144 by the operation of its "set" terminal.

Thus, if the three-cycle counter 122 has tracked a target in the short track mode for approximately 90 milliseconds, 30 probe pulses were counted for each of the three phases, totalling 90 pulses. In the same manner, when the manual switch 115 (FIG. 1) is thrown to the long track position, the 226 count controls AND gate 116, and precludes the short track program of 30 pulses. It will be understood that other cycle periods could be selected depending upon the target tracking period desired. Suitable modifications of the logic required for arranging the comparator 110 to process unequal probe periods will be apparent to those skilled in this art.

The operation of FF 144 to an "on" condition thus indicates the end of the complete tracking period including the operation of the modulo N dividers 162 and 168, both for the range rate and range accumulator and all other computations.

As explained above, the operation of the zero indicators 160 and 170 upon reaching zero applies a pulse to the off gates 146 and 150 to inhibit and thereby prevent further clocking into the computer circuit from the clock 50. Simultaneously, the zero detectors 160 and 170 apply respectively a pulse to the AND gate 176. Thus, with AND gate 176 enabled by the two inputs, as well as the pulse from the set state of FF 144, gate 176 produces a pulse to operate gate 178 to pass therethrough the next $T_0$ pulse 180 to indicate the "end of a good track" over conductor path 182. Thus, at the end of counting 90 pulses of $T_0$ probes, the 91st pulse will be passed through the gate 178 to a tau limit detector 184. The operation of gate 178 by the $T_0$ pulse 180 also resets FF 144.

The end of a good track pulse 180 from gate 178 indicating the track has been completed is also utilized over conductor path 183 to the target assessor 24 for requesting a new target to track as previously described.

(TAU DETECTION)

The tau limit detector 184 is suitably an array of logic counters arranged to compute the ratio of range rate ($\dot{R}$) and range ($R$). This ratio, as well known in the art, is the time of closure or departure of the target being tracked. Essentially, the tau limit detector 184 is a divider of any suitable type well known in the art. The respective inputs of the tau limit detector 184 comprise the output from the range rate BCD counter 163 and the range BCD counter 165. These counters also supply an output signal to the memory divider and decoder 154 for the range rate (knots) and the memory driver and decoder for the range computation 155 (distance).

(DISPLAY CONTROL)

An AND gate 186 normally gated to apply a display supply voltage, suitably 5 volts to the display bus for knots readout 172 and nautical miles readout 174 which are respectively arranged to operate only if such a voltage is supplied. When AND gate 186 is inhibited by the off lead from the interval timer 188 suitably arranged to time-out within a desired interval, the display panels are darkened so that the operator or observer will not be distracted by an indication of a target which has long been passed for other tracking cycle. The tau limit detector 184 is, furthermore, arranged to indicate a critical time of closure over path 189 to the memory and driver 190. If the rate of change of the target is positive (over path 105), it is indicative of the target approaching the station aircraft carrying the digital tracker. This control function is achieved by the range rate up/down counter 100 providing a logical 1 or 0 voltage level over lead 105 to the memory driver decoder 154 as well as the tau limit detector 184. When the count for range rate during the up cycle is less than the rate for the down count during the down count cycle, the range rate is therefore such that the target aircraft is flying away or departing the subject aircraft. In such a target track the positive indication to the tau limit detector 184 would be such as to inhibit any signal being provided to the pilot by the lighting of the "tau"

light 192. Thus, when the range rate 100 has a count on the down cycle which is less than the count on the up cycle the target in question is approaching the aircraft and the counter 100 will develop a positive pulse on path 105. A positive pulse (or a logical 1) to the tau limit detector 184 will enable a pulse on the limit path 189 to effect an indication of the tau light 182, when the tau calculated is 60 seconds or less. However, a negative pulse (or logical 0) will indicate a departing target. Such a signal inhibits the tau limit detector from operating the tau light even though the range and rate range is within tau limit range. The 60-second criterion is a chosen parameter of critical time indicating to a pilot that his aircraft is in jeopardy relative to a target that has been tracked. Other number criteria for tau could be used other than 60 seconds as will be apparent to those skilled in the art.

(Jitter Commands and Control)

In a preferred form of the SECANT system the transmitted probe pulses P or Q are jittered about a reference time interval to increase the randomness of the probes in a manner well known in the art. The $T_O$ pulses as previously indicated are nominally 1.2 microseconds in duration. Each pulse is spaced from a preceding pulse by 1 millisecond under control of a one kilohertz clock. A 1 kilohertz clock pulse can be developed from clock 50 which is nominally 9.7125 megahertz, by a count down logic circuit of approximately 1,000. The "jitter" operation means, not shown, occurs in the transmitter of the radar system or the correlator of the SECANT system. It is preferred that the $T_O$ pulses be jittered from the nominal period by a rate up to 250 microseconds on a random basis. This procedure, as known in the art, produces the jitter that suppresses false signals. According to the present embodiment, the tracker system is operated to have jitter for all acquisition and tracking operations except for the period of a "long track" as represented by 678 $T_O$ probes. To assure that no jitter occurs during this tracking period, the radar or SECANT correlator system is provided with a command to inhibit the jitter circuit. This is effected, by reference to FIG. 2b, over lead 194. The circuit arrangement for controlling the jitter command comprises a comparator 196 for setting a gate 198 when 100 probes are counted by the probe counter 106. This counting function is accomplished by the output of probe counter 106 applied over path 200 to comparator 196 and to comparator 202. When comparator 196 is counted to 100 pulses the bias circuit 204 is arranged to provide a voltage bias to effect an output pulse over path 206 to gate 198. The output of gate 198 is the jitter command to stop the jitter circuit in the correlator or in the appropriate radar equipment. Similarly, when comparator 202 receives 578 pulses from the output of the probe counter 106 the voltage control bias 208 provides the appropriate voltages for biasing the comparator counters 202 to effect an output to the OR gate 210. The pulsed OR gate applies a pulse to gate 198 to reset it so that the jitter command is restarted to renew the jitter function previously described. It is to be noted that the circuit thus provides a means for stopping the jitter command on a first number of pulses, in this instance 100 $T_O$ pulses, and to restart the jitter after a total of 578 pulses have been accumulated. Other quantities of $T_O$ pulses for establishing the period of no-jitter command will be apparent to those skilled in this art.

(CORRELATOR STROBE PULSE)

The correlator strobe pulse previously described to indicate to the digital tracker that the target range is confirmed is applied to OR gate 126 to reset the probe counter 106 to assure the counter is cleared to receive data on a new track. Simultaneously, it is applied to three-cycle counter 122 to reset the counter to zero and to OR gate 210 over path 209 to effect a reset of jitter command gate 198 in the event a target is lost during a probe counting cycle.

The strobe pulse at the same time is applied to gate 212 for passing the $T_O$ pulse to the interval timer 188, for inhibiting the AND gate 186 whereby the displays of 172 and 174 are wiped out as previously described. This function is provided for those situations where a target is not tracked for a prescribed or predetermined period of time. In the present embodiment, the period of 0.896 seconds is used as the criterion for determining when to erase a display so that the pilot will be assured the display represents current data. Other intervals may be chosen as desired. The interval timer 188 is a conventional timer that clocks off 0.89 seconds based on the 1 kilohertz clock pulse passed through gate 212. In this case it is noted that since the $T_O$ pulses are transmitted on intervals of 1 kilohertz this is a ready reference for a 1 kilohertz clock source.

(TARGET ASSESSOR)

The target assessor illustrated by block 24 in FIG. 1 provides an assessment of the status of the target by digital processing of the target responses. In the preferred form of the system for tracking a target, the target is arranged to revert to the track mode of operation when three consecutive target responses are received within the acquisition mode.

The acquisition mode consists of the first eight probe intervals following the initial target location hand-off signal $T_R$ from the correlator 10.

However, if the condition of three consecutive target responses is not satisfied within the first eight probe intervals after a target designation, acquisition is aborted and a request is made for another relevant target location. The target assessor 24 is provided with appropriate logic circuits including counters, and gates of suitable form arranged to provide the various digitial processing operations of the target response inputs indicated. After acquisition, the track signal 108 is activated, the digital tracker will remain in the track mode providing preferably at least six replies are received out of any ten consecutive probes. If this condition is not satisfied, the target is considered lost whereby a signal is generated over path 310 for an indication by the light 313 that the target has been lost. A signal indicating that the target has not been acquired is generated over path 312 for illuminating target "acquisition failed" light 316. After the target has been lost or has failed acquisition, a request is initiated for the location of the next priority target as determined by the radar acquisition system or the correlator of the SECANT system.

Digital Range Rate Computer

The operation of the digital range rate computer feature will now be described. After the track length is selected by the manual switch 115 for either the long track or short track, and the track mode is entered into, the probe counter 106 detects one-third of a track period of counting the $T_O$ pulses, that is, the interrogation pulses, over path 109, shown both in FIG. 1 and FIG.

2. At the end of each one-third track period, the three cycle counter 122 is clocked once and the probe counter is reset to zero.

The three outputs of the three cycle counter 122 controls the counting mode of the range rate up/down counter 100. For the first one-third of the track period, the counter 100 is programmed to count up by means of the activation of the track signal 108 as detected by ONE SHOT 107. For the next one-third of a track period, the counter is inhibited from further counts by means of the stop input over path 128 caused by the activation of path 1. For the final one-third of a track period, the counter 100 is arranged to count down by the pulse to its down input over path 132 caused by activation of path 2. At the end of the final one-third of a track period, path 3 of counter 122 is activated to energize ONE SHOT 136. The leading edge of pulse 138 from ONE SHOT 136 is used to stop further counting by counters 100 and 102 until gates 146 and 150 are activated. This counting sequence provides the necessary smoothing for range rate accuracy.

The counter 100 as previously described, is formed of a chain of synchronous up/down counters that accumulate the target range counts. The counter chains are subdivided into two portions; a BCD stage and a binary stage where the output of the BCD feeds the input of the binary stage. The output of counter 98 over path 99 (1/120) is applied to the binary stage, bypassing the first BCD stage while the output of the vernier 38 over path 264 (1/1,200) is applied directly to the BCD stage. Thus, there will be 10 vernier counts to equal one count from −10 counter 98. These counts are resolved into the time interval of the target's radar range using clock 50 whose rate is quite accurate, preferably at the frequency indicated in the drawing, namely, 9.7125 MHz, to 30 parts per million. For a given pulse $T_O$ and its corresponding reply pulse 26, the range count pulses from gate 78 resolve a target range to the nearest 50 feet while the vernier count pulses over path 264 resolves the range still further to the nearest five feet as previously explained with respect to the operation of the range vernier 38.

Both types of range counts are applied to the range rate counter 100 following the transmission of each radar probe during the track period, the probes being transmitted approximately once every 1.03 milliseconds. The 50 foot range count bypasses the first counter stage, which thereby weights the coarse range counts by a factor of 10 over the 5 foot counts.

At the completion of the down count, by counter 100, the resulting difference obtained by the counter respresents the time smoothed average change in the target range sampler for 90 or 678 times depending on the mode. At this time, the sign of the contents of the range rate counter 100, is sampled in any suitable manner known in the art. A preferred procedure is to detect the logic state of the most significant bit of the counter chain of the counter 100 which is provided with sufficient stages as to be at least two times more than adequate to handle any of the range counts that are expected to be remaining after the final down counts. Accordingly, since the counter chain is too long to overflow the most significant bit, a logical 0 implies a closing or approaching target since the down count must necessarily have been less than the initial up count while a logical 1 indicates an opening or departing target for similar reasons. The range difference is then clocked into the range rate divider 101 (shown in both FIGS. 1 and 2), the divisor of which is arranged to convert the difference into range rate expressed in knots. For the long track, the divisor is 35 while for the short track the divisor is 0.6.

The divisors are suitably selected based on the number of clock pulses per mautical mile, the number of samples taken, the time between the average up-count range and the average down-count range and the conversion of milliseconds to hours. The division is accomplished at the end of the track period as indicated by the "divide command" (described above) over path 156 by using the trailing edge of pulse 138 to enable the clock pulses through gate 146 to drive the modulo N divider 162 for the time required to simultaneously clock the range difference in the counter 100 to zero as indicated by the zero detector 160. To reach zero, the range rate counter is either counted down for a closing target or counted up for a departed or opening target. Upon reaching zero the clock is inhibited over path 166. To facilitate division by 0.6 for the short track mode, the counter 100 is clocked at 1/10th the frequency of the divider 101 and the divisor is set to equal six. The output of the range rate divider 101 is accumulated in the counter 163 which as indicated is formed of four four-bit BCD counters. The contents of the counter 163 is the target range rate expressed in knots and along, with the plus or minus sign, is passed to the memory driver decoder which then provides a display on the indicator 172.

Operation of the Digital Tracker

In summary, the digital tracker receivers $T_O$ pulses from the correlator or the radar system equipment over path 40. The strobe or target verification pulses are received over path 250 and the target video return pulses are received from the receiver over path 13 and are gated by the gate 16 to pass the video reply pulse 26 that occurs during the range gate pulse 79. The long and short range track mode instructions are determined by the selection switch 115 on the control panel 114. The tracker functions to perform the acquisition of the target that was handed-off (by pulse $T_R$) just prior to the strobe pulse and track that valid target for either 678 pulses for the long track or 90 pulses for the short track or until the target is lost.

If acquisition is not achieved within eight probe pulse intervals following the target handoff, another target is requested from the correlator unit over tracker status path 68. New target locations are also requested when the present target is lost, or the track is relinquished and a new target is requested after each "good track" operation has been performed as indicated by the signal over path 182, previously described. The digital tracker displays the average target range in nautical miles and the average range rate in knots over the track period. The tau light 192 is also illuminated when the time of impact is less than the prescribed period. In this embodiment that period is 60 seconds as has been previously explained.

Tracker Timing Chart (FIG. 5)

Referring now to FIG. 5 there is shown a chart of the several signals and pulses that are used and generated in the operation of the digital tracker, particularly the embodiment illustrated in FIG. 1. It is assumed in the operation of the tracker that the correlator 10 has determined that one or more targets are within range and should be tracked. The operation starts on the assumption that the tracker is awaiting a target assignment. The chart is arranged with reference to the periodic transmission of the $T_O$ probe pulses representing the transmission of the P and Q RF signals from the transmitter (not shown) associated with correlator 10 for transmission to target aircraft within a suitable range, for example, 10 miles. The repetition rate of the $T_O$ pulses is 1 millisecond as indicated.

The first receipt of a pulse $T_O$ over path 40 (FIG. 1) is followed by pulse $T_1$ after passing through the 1.3 microsecond delay 80 for enabling the gate 78. Pulse $T_1$ delayed by the 2.4 microsecond delay 44 enables gate 42 for clocking the range counter 52. The range counter then immediately starts counting the clock pulses over path 55, the counts being represented by the pulses 330 each of which represents a range of 50 feet. At the completion of the count, the $T_R$ pulse 64 received over path 62 is passed through the enabled gate 66 through OR gate 37 to turn off gate 42 and thereby stop the clock 50 from passing clock pulses to the range counter 52. The $T_R$ pulse, it is to be noted, is received from the correlator 10 representative of the centroid detector pulse 28 of the new target to be tracked.

Thus, the receipt of the $T_R$ pulse ending the range counts 330 defines the range between its leading edge and the leading edge of the $T_1$ pulse which enabled gate 42. Next, the strobe pulse over path 250 is received from the correlator indicating a verified target, passing through the enabled AND gate 252 to load the range register 56 so that the count of range counter 52 is read into the range register 56. The strobe pulse is applied to the target assessor 24 to remove the tracker status signal over path 68 to advise the correlator 10 that a target has been received. The $T_O$ pulse was delayed through the 150 microsecond delay 50 which develops a transfer command pulse (332) over path 51 for triggering the presetable down counter 58 to load it with the count from range register 56.

The data transfer to the presetable down counter 58 is delayed by the 0.5 microsecond delay 254 delaying the strobe pulse received over path 250 in order to prevent a race of the type wherein the presetable down counter would possibly have been loaded with a count from range register 56 that was prior in time to the final registration in the range register.

During the sequences prior to the transfer command 332, clock pulses corresponding to a provisional range count are applied to the presetable down counter 58 over path 82 through the enabled gate 78. At the end of the burst of range counts 334 causing the presetable down counter to count down to zero, the zero register 60 develops an all zero pulse 336. The all zero pulse 336 energizes ONE SHOT 70 whose output is passed through AND gate 72 enabled by any clock pulse to develop pulse 77 which energizes 1 microsecond gate generator 76 whose output is the 1 microsecond range gate 79.

The gate generator 76 also generates the vernier gate pulse 92 over path 272, 0.5 microseconds after range gate 79 as shown on line "Range Gate." Note that the leading edge (left side) of pulse 77 coincides with the leading edge of the range gate 79, and the leading edge of vernier gate 92 coincides with the midpoint of range gate 79. This time relation as explained previously assures that the range 79 will surround the centroid of the video pulse 25 from receiver 12.

Range gate 79 is passed by enabled gate 18 over path 17 to enable the analog range gate 16, the enabling pulse indicated by 338 on the chart (FIG. 5).

The operation of the tracker as just described represents the sequences during the handover by the correlator of a particular target. When the strobe pulse over path 250 caused the tracker status signal applied to the correlator to go low over path 68, the target assessor 24 also caused the acquisition or track (AOT) signal over path 69 by a voltage change indicated by step 340 on the chart.

AND gate 18 enabled by the stepped voltage 340 over path 69 starts the acquistion and tracking of a target (after receiving the second $T_O$ pulse) by enabling gate 16 6o receive video reply signals 25 from receiver 12 over path 13. Prior to this time, the range counts were accumulated, under control of the $T_O$ pulse of gate 78 to provide range clock counts to the $-5$ count counter 96, which after absorbing five range counts passed subsequent range counts over path 97 to the range accumulator 102. These range counts are illustrated in the chart by the range counts 344. The same clock pulses from gate 78 are passed to the $-10$ count counter 98 which after absorbing 10 clock counts, pass the subsequent range counts over path 99 to the range rate up-down counter 100. These range counts are represented by counts 346 on the chart.

It will be noticed that the range counts 334 activating the down counter 58 ove path 82, counts five more counts than the range counter 334, and 10 more counts than the range count 346, which differences are shown in the chart.

The video reply signal 25 on path 13 from receiver 12, corresponds to the SECANT $P^-$ or $Q^-$ reply signals. Pulse 25 does not pass through the analog range gate 16 since gate 16 has not yet been enabled by range gate 79. However, a $T_R$ signal duplicates the functions of the absent centriod pulse 28, by inhibiting gate 42 through OR gate 37. Thus, the range counter functions to count the range of the new target. When the range gate 79' is generated the acquisition mode has been started and will continue for the next eight $T_O$ intervals. It will be understood that the tracker commences its tracking mode only after the target has been acquired. The acquisition of the target is achieved after the target assessor 24 has received three consecutive detected signals (pulse 28) during the first eight $T_O$ pulses. This is achieved by the target assessor 24 receiving the $T_O$ signals over path 41 and the centroid target pulses 28 over path 30. Suitable logic circuits in assessor 24 compares the pulses $T_O$ and pulses 28 to determine three such consecutive pairs of signals. When such consecutiveness is achieved, acquisition is established whereby track signal 108 is applied to the program control unit 104, shown in greater detail in FIG. 2 and described above. Note from the chart (FIG. 5) that the centroid of video pulse 26 is approximately in the center of range gate 79'. The centroid detector target pulse 28 is developed by the detector 20 whereby its leading edge is delayed 0.5 microseconds from the centroid of pulse 26. The leading edge of the centroid pulse 28, it is to be also noted, is substantially coincident with the trailing edge of the range gate 79 and is also the center of the vernier gate 92'. The centroid detector pulse 28 then starts the range vernier 38 over path 36 to count the range counts such that the first five counts represented by $t_1$, represent the first 10 counts of the range counter corresponding to 500 feet in range. The remaining counts, received during the time for the voltage discharge path 284 (corresponding to the voltage discharge of capacitor 284 in FIG. 3A) provide the "stretching" count of the range vernier.

During the vernier count, the centroid pulse 28 also energizes ONE SHOT delay 256 which develops a pulse 348 which triggers the comparator 54 over path 258 to cmpare the range counter reading 52 to the range register 56 reading. As previously described, the comparator determines from this comparison whether or not the range register should be changed by being added or subtracted by a limited range count. It is to be noted that the trigger pulse 348 occurs after the range counter has completed its count.

This mode of tracking the target by range gate 79' is continuously repeated by gate 79' being repeatedly energized to gate the video signal 25. This is repeated as long as the AOT signal on path 69 remains high.

Once a track has been lost or has stopped, AOT signal on path 69 will go low, the tracker then reverts to its original idle position and repeats the sequence of operations just described.

It will be understood that the operation of the range counters, described with respect to FIG. 2, occurs during the time the range rate up-down counter 100 is receiving its range counts over path 99 whereby the statistical smoothing or averaging of range count is established.

CENTROID DETECTOR (BLOCK 20)

In the SECANT system, where target reply signals ($T_o$) vary in amplitude, it is advantageous to track the centroid of a target signal rather than its leading edge as is done in conventional systems. A preferred form of a centroid detector, illustrated in FIG. 4, utilizes a conventional 1 microsecond delay line 222 having 10 taps 224. The amplitude of a target signal is indicated by the ideal dotted line 226, understanding that the true wave shape is generally curved. For illustrated purposes the representative target signal 226 has a center line 228 representing its symmetrical center or centroid of the amplitude. In general, the purpose of this preferred from of the centroid is to add the voltages appearing on the first five taps 224 and comparing that summation to the summation of voltages appearing on the last five taps 224. The target centroid is determined by the equality between the two signal summations. Ten resistors 230 of equal value are connected respectively to the 10 taps on the delay line 222. The input of a first integrating (A1) amplifier 231 receives the common terminal from the first five resistors and the second integrating (A2) amplifier 232 receives the common terminal from the five resistors 230 connected to terminals 6 through 10 of the delay line. The output ($E_o$) of the summing amplifier 231 is applied as one input to a comparator or differential amplifier 238, while the output ($E_1$) of summing amplifier 232 is applied as a second input to the comparator amplifier 238. As the input signal 26 is conducted through the delay line 222 the voltage distribution across the resistors 230 will be such as to be greater through amplifier 231 as compared to the signals voltage passing through the amplifier 232. As the signal 26 approaches the central portion corresponding to the wave shape envelope 226, the voltage summed through amplifier 231 will approach and be equal to the voltage through amplifier 232. After 0.5 microseconds, the two voltages are equal, and the voltage output of the amplifier 238 will be such as to develop a zero pulse as the input to the AND gate 240. Comparators 234 and 236 are connected in parallel to the output of the summing amplifier 231 and 232 to provide for assurance that noise is not the signal being considered. The comparators are provided with calibration resistors R3 to establish a minimum value of a signal $E_O$ and $E_1$ that can be passed through it. The inverters 242 and 244 provide a zero signal when the comparator output 234 and 236 are assured to be of a certain value above noise. When the output of the two comparators 234 and 236 and the differential amplifier 238 are zero, the AND gate 240 is gated developing a high voltage for gating the ONE SHOT 242 designed for a 1 microsecond pulse. The output of the ONE SHOT 242 over lead 30 (repeated here from FIG. 1) is detected pulse 28. The pulse 28 is carried by conductor path 32 (FIG. 1) and passed through the digital loop comprising the range counter 52 and range register 56 through the down counter 58 and back through the ONE SHOT gate generator 76 to control the analog range gate 16. If the 1 microsecond range gate is not matched against the reply pulse 26, the mismatch will be detected by the summing amplifier 231 and 232 causing a displacement of the range gates with respect to the video signal. Thus, when the centroid of the input video signal 26 has been established by the centroid detector circuit 20, the output pulse 28 will have its leading edge occur 0.5 microseconds after the centroid of the video signal. It is noted that the delay line has a one microsecond delay time so that the midpoint thereof is a one-half of a microsecond. Therefore it is the leading edge of the output pulse 28 which is 0.5 microsecond delayed from the center line or centroid of the input video pulse 26.

What is claimed is:

1. A limiter for track gate movement of a track gate for a digital radar tracker wherein reply signals from a remote station are responsive to interrogation signals having a predetermined repetition rate, comprising:

a track gate for receiving said reply signals, said track gate being rendered operative by a tracking gate pulse, means for generating said tracking gate pulse for limited changes in range of said remote station, said means including:

a digital counter of time intervals between said interrogation signals and said reply signals representing the range to said remote station, a digital register for storing the range count of said counter, means for transferring the count of said counter into said register, a digital comparator for comparing the count of said counter to the count of said register, means responsive to said reply signals for enabling said comparator to determine the relative counts of said counter and said register, means responsive to a control pulse for altering the count in said register a predetermined increment in accordance with relative counts determined by said enabling means, and means coupling said altering means to said tracking gate pulse generating means to generate thereby said tracking gate pulse.

2. A limiter according to claim 1 wherein said incremental alteration is limited between interrogation signal intervals to a range count proportional to ± 1/120 nautical miles.

3. A limiter according to claim 1 including means for altering said register only for changes in said counter.

4. A limiter according to claim 1 including a down counter coupled to said register,
means to detect a zero count from said down counter, and
clock means for controlling the rate of said down counter.

5. A limiter according to claim 4 including means for generating a pulse when said down counter indicates zero,
said pulse being applied to tracking gate pulse generating means to generate said tracking pulse.

6. A circuit for limiting changes in range data for a digital radar tracker wherein reply signals from a remote station are responsive to interrogation signals having a predetermined repetition rate comprising:
means for determining the range of said remote station in response to said interrogation signals,
means responsive to said reply signals for storing indicia corresponding to said range, and
means for limiting changes in said indicia means to an increment less than any possible change in range that can occur between any sequential pair of said interrogation signals.

* * * * *

UNITED STATES PATENT OFFICE
CERTIFICATE OF CORRECTION

Patent No. 3,803,605          Dated April 9, 1974

Inventor(s) Jeffrey Ellis Miller and Bernard Case

It is certified that error appears in the above-identified patent and that said Letters Patent are hereby corrected as shown below:

Column 1, line 8 insert --now U.S. patent 3,755,811-- after "System," Column 1, line 13 insert --Serial No. 269,535-- after "Computer,"; Column 1, line 16 insert --Serial No. 269,536-- after "Tracker,"; Column 8, line 6 "50" should read --49--; Column 9, line 63 change "50" to read --49--; Column 10, line 3 delete "Since" and capitalize "The" line 4; Column 11, line 63 "286" should be --296--; Column 12, line 40 "70" should be --79--; Column 13, line 25 "95" should be --96--; Column 18, line 4 "126" should be --127--; Column 20, line 32, "receivers" should read --receives--; Column 22, line 15, "6o" should be --to--.

In the Drawing: Figure 1-reference numerals 155 should read 154; 190 should read 155; 50 for block "DELAY" should read 49; "RATE" in block 165 should be deleted. Remove arrow from lead 81 to gate 76. Figure 2a - lead line for reference numeral "264" should be to the "RANGE COUNTS" conductor connected to OR gate 156 rather than to conductor "99".

Signed and sealed this 3rd day of December 1974.

(SEAL)
Attest:

McCOY M. GIBSON JR.
Attesting Officer

C. MARSHALL DANN
Commissioner of Patents